(12) United States Patent
Gu

(10) Patent No.: US 11,922,919 B2
(45) Date of Patent: Mar. 5, 2024

(54) METHOD AND APPARATUS FOR NOISE REDUCTION, AND HEADSET

(71) Applicant: TELINK SEMICONDUCTOR (SHANGHAI) CO., LTD., Shanghai (CN)

(72) Inventor: Xiaowen Gu, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/716,635

(22) Filed: Apr. 8, 2022

(65) Prior Publication Data

US 2022/0328031 A1    Oct. 13, 2022

(30) Foreign Application Priority Data

Apr. 9, 2021  (CN) .......................... 202110383255.0

(51) Int. Cl.
| | |
|---|---|
| G10K 11/178 | (2006.01) |
| G01C 19/00 | (2013.01) |
| G06F 3/0346 | (2013.01) |
| H04R 1/10 | (2006.01) |
| H04R 1/40 | (2006.01) |
| H04R 3/00 | (2006.01) |

(52) U.S. Cl.
CPC ........ *G10K 11/17854* (2018.01); *G01C 19/00* (2013.01); *G06F 3/0346* (2013.01); *G10K 11/17823* (2018.01); *G10K 11/17881* (2018.01); *H04R 1/1083* (2013.01); *H04R 1/406* (2013.01); *H04R 3/005* (2013.01); *G10K 2210/1081* (2013.01); *G10K 2210/3027* (2013.01); *G10K 2210/3028* (2013.01); *G10K 2210/3044* (2013.01); *G10K 2210/3215* (2013.01); *H04R 2460/01* (2013.01)

(58) Field of Classification Search
CPC ... G10K 2210/1081; G10K 2210/3215; G10K 2210/111; H04R 2460/01; H04R 3/005
See application file for complete search history.

(56) References Cited

U.S. PATENT DOCUMENTS

| | | |
|---|---|---|
| 10,595,149 B1 | 3/2020 | Lovitt et al. |
| 2010/0131269 A1 | 5/2010 | Park et al. |

(Continued)

OTHER PUBLICATIONS

Extended European Search Report dated Jul. 29, 2022 in European Application No. 22167340.3, 11 pages.

*Primary Examiner* — Ping Lee
(74) *Attorney, Agent, or Firm* — Nixon & Vanderhye P.C.

(57) ABSTRACT

The present disclosure provides a method and an apparatus for noise reduction, and a headset. The method of noise reduction includes: acquiring a first reference noise signal; acquiring an initial direction of desired speech in response to a trigger signal; acquiring a real-time direction of desired speech based on a real-time orientation of the headset and the initial direction of desired speech, the real-time orientation being obtained by orientation tracking for the headset; filtering out a desired speech signal from the first reference noise signal to acquire an undesired noise signal, the desired speech signal being extracted in the real-time direction of desired speech; and filtering the undesired noise signal to output an inverse noise signal for speaker playback. Thus, using the method of noise reduction, not only the undesired noise in the ambient noise can be cancelled, but also the desired speech signal can be retained.

14 Claims, 4 Drawing Sheets

(56) References Cited

U.S. PATENT DOCUMENTS

| | | |
|---|---|---|
| 2012/0215519 A1 | 8/2012 | Park et al. |
| 2015/0195641 A1 | 7/2015 | Di Censo et al. |
| 2018/0233125 A1 | 8/2018 | Mitchell et al. |
| 2020/0135163 A1 | 4/2020 | Lovitt et al. |
| 2020/0296668 A1 | 9/2020 | Xu et al. |

METHOD AND APPARATUS FOR NOISE REDUCTION, AND HEADSET

CROSS-REFERENCE TO RELATED PATENT APPLICATION

The present disclosure claims the benefit of and priority to Chinese Patent Application No. 202110383255.0 filed on Apr. 9, 2021, the entire disclosure of which is incorporated by reference herein.

TECHNICAL FIELD

The present disclosure relates to the field of signal processing technologies, in particular to a method and an apparatus for noise reduction, and a headset.

BACKGROUND

In the existing active noise cancellation (ANC) system, the external noise is firstly picked up by a reference microphone to acquire a reference noise signal. The reference noise signal is then filtered by an ANC filter to generate an inverse (i.e., phase-inversed) noise signal for speaker playback, and the inverse noise played by the speaker cancels the external noise. The uncancelled external noise is then picked up as residual noise by an error microphone to acquire an error noise signal, which is in turn used by an adaptive controller to update coefficients of the ANC filter, such that the inverse noise can better cancel influences of the external noise in the headset.

In occasions such as a waiting room or lounge, the user wearing the headset may desire to suppress the external noise without missing desired speech such as voice announcements. However, the desired speech such as voice announcements may be cancelled as noises by the existing ACN filter. Thus, to listen to the desired speech, the noise reduction function of the headset needs to be turned off, which results in a poor user experience.

SUMMARY

An object of the present disclosure is to provide a method and an apparatus for noise reduction, and a headset to overcome the deficiencies of the prior art.

In order to solve the aforesaid technical problems, embodiments of the present disclosure provide a method of noise reduction, applicable to a headset provided with a noise reduction function, the method including:
  acquiring a first reference noise signal;
  acquiring an initial direction of desired speech in response to a trigger signal;
  acquiring a real-time direction of desired speech based on a real-time orientation of the headset and the initial direction of desired speech, the real-time orientation being obtained by orientation tracking for the headset;
  filtering out a desired speech signal from the first reference noise signal to acquire an undesired noise signal, the desired speech signal being extracted in the real-time direction of desired speech; and
  filtering the undesired noise signal to output an inverse noise signal for speaker playback.

In order to solve the aforesaid technical problems, embodiments of the present disclosure also provide an apparatus for noise reduction, applicable to a headset provided with a noise reduction function, the apparatus including:
  a first acquiring module configured to acquire a first reference noise signal;
  a second acquiring module configured to acquire an initial direction of desired speech in response to a trigger signal;
  a third acquiring module configured to acquire a real-time direction of desired speech based on a real-time orientation of the headset and the initial direction of desired speech, the real-time orientation being obtained by orientation tracking for the headset;
  a first filtering module configured to filter out a desired speech signal from the first reference noise signal to acquire an undesired noise signal, the desired speech signal being extracted in the real-time direction of desired speech; and
  a second filtering module configured to filter the undesired noise signal to output an inverse noise signal for speaker playback.

In order to solve the aforesaid technical problems, embodiments of the present disclosure also provide an apparatus for noise reduction, which includes:
  at least one processor; and
  a memory communicatively connected with the at least one processor;
  wherein the memory has instructions executable by the at least one processor stored therein, the instructions, when executed by the at least one processor, causing the at least one processor to execute the aforesaid method.

In order to solve the aforesaid technical problems, embodiments of the present disclosure also provide a headset, which includes the aforesaid apparatus for noise reduction, and further includes: a microphone array for beamforming, a reference microphone for picking up a first reference noise signal, an error microphone for picking up an error noise signal, and a speaker for playing an inverse noise signal.

Compared with the prior art, embodiments of the present disclosure has following advantageous technical effects. In most cases, the sound source of the desired speech has a relatively fixed location, and also a relatively fixed direction relative to the location of the headset wearer (or changes in the direction are negligible). The turning of the user's head may cause changes to the orientation of the headset. Thus, it may be deduced that the direction of the sound source of the desired speech relative to the headset is changed in an opposite direction to the turning of the headset, such that the orientation of the desired speech signal relative to the headset can be determined in real time, thereby allowing to separate the desired speech signal from the undesired noise signal. In addition, the filter coefficient is updated merely based on the undesired noise signal, which enables the user to hear the external desired speech without being disturbed by the external undesired noise.

DETAILED DESCRIPTION

In the present disclosure, it should be understood that terms such as "include" or "have", etc., are intended to indicate the existence of the characteristics, figures, steps, actions, components and parts as disclosed in the present disclosure or combinations thereof, without excluding the existence of one or more other characteristics, figures, steps, actions, components, parts or combinations thereof.

Furthermore, it should be noted that, in the case of no conflict, the embodiments of the present disclosure and features of the embodiments may be combined with each other. The present disclosure will be described in detail below with reference to the accompanying drawings and embodiments.

The present disclosure will be further described in detail below in conjunction with embodiments shown by the accompanying drawings.

Figure 1:
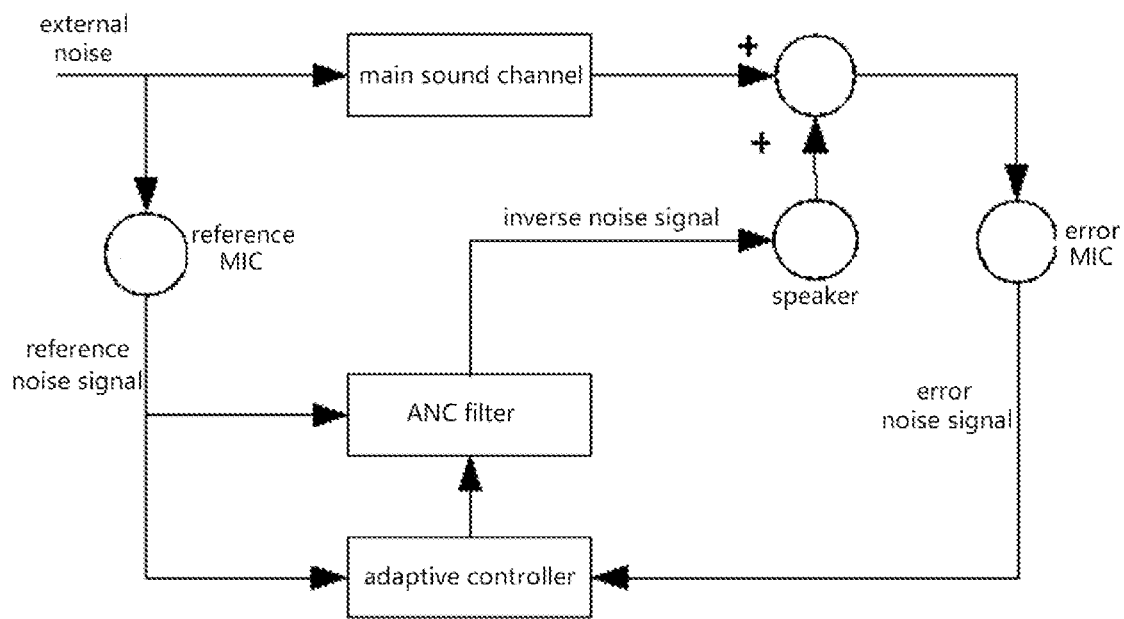
FIG. 1 is a schematic structural diagram of a headset in the prior art.

FIG. 1 is a schematic structural diagram of an existing active noise cancellation (ANC) system. The active noise cancellation system in the prior art cannot identify the desired speech and undesired noise, which may cause a complete filtering out of the desired speech or a poor user experience due to the too loud undesired noise.

Figure 2:
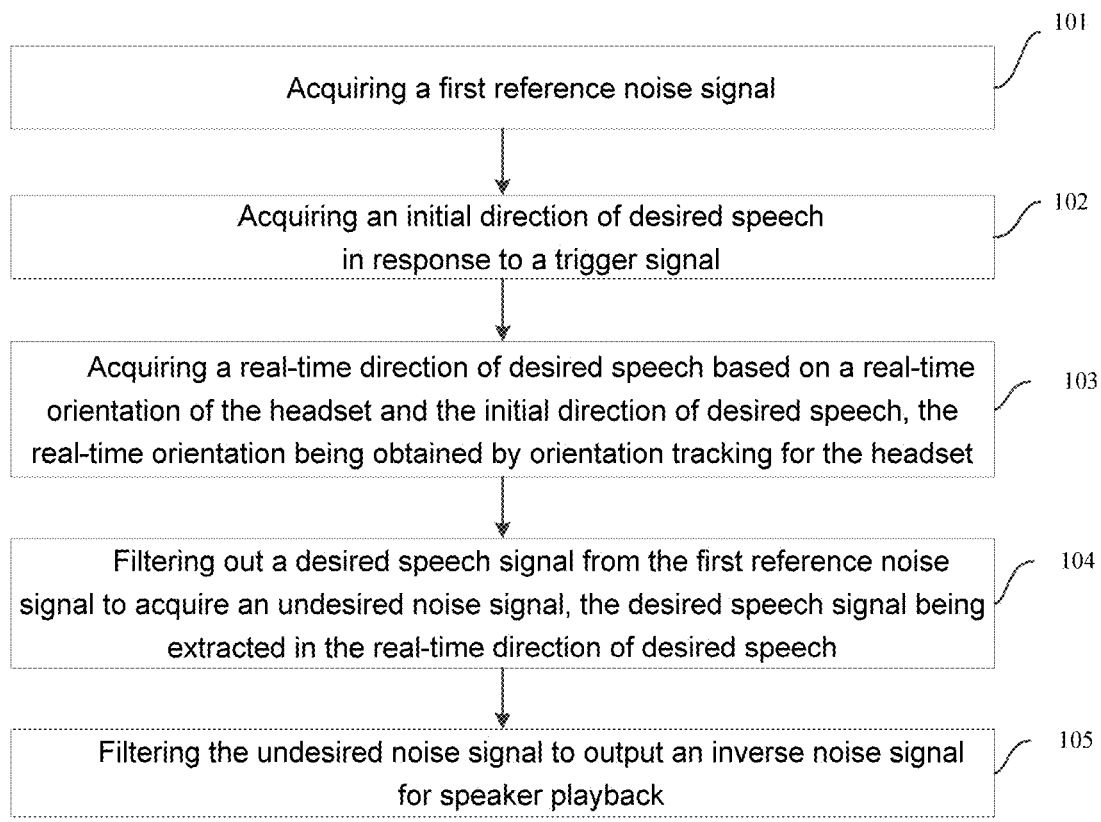
FIG. 2 is a flow chart of a method of noise reduction according to embodiments of the present disclosure.

Embodiments of the present disclosure provide a method of noise reduction which is executable by an apparatus for noise reduction installed on the headset or a program running on the headset. As shown in FIG. 2, the method includes following steps:

step 101: acquiring a first reference noise signal;

step 102: acquiring an initial direction of desired speech in response to a trigger signal;

step 103: acquiring a real-time direction of desired speech based on a real-time orientation of the headset and the initial direction of desired speech, the real-time orientation being obtained by orientation tracking for the headset;

step 104: filtering out a desired speech signal from the first reference noise signal to acquire an undesired noise signal, the desired speech signal being extracted in the real-time direction of desired speech; and step 105: filtering the undesired noise signal to output an inverse noise signal for speaker playback.

The first reference noise signal is picked up by a reference microphone installed on the headset and output to the apparatus for noise reduction on the headset. The trigger signal is entered into the apparatus for noise reduction by an external component of the apparatus for noise reduction. The orientation of the headset may be determined by the prior art such as a gyroscope.

In most cases, the sound source of the desired speech has a relatively fixed location, and also a relatively fixed direction relative to the location of the headset wearer (or changes in the direction are negligible). The turning of the user's head (or body) may cause changes to the orientation of the headset. Thus, it may be deduced that the direction of the sound source of the desired speech relative to the headset is changed in an opposite direction to the turning of the headset, such that the orientation of the desired speech signal relative to the headset can be determined in real time, thereby allowing to separate the desired speech signal from the undesired noise signal. In addition, the filter coefficient is updated merely based on the undesired noise signal, which enables the user to hear the external desired speech without being disturbed by the external undesired noise.

Figure 3:
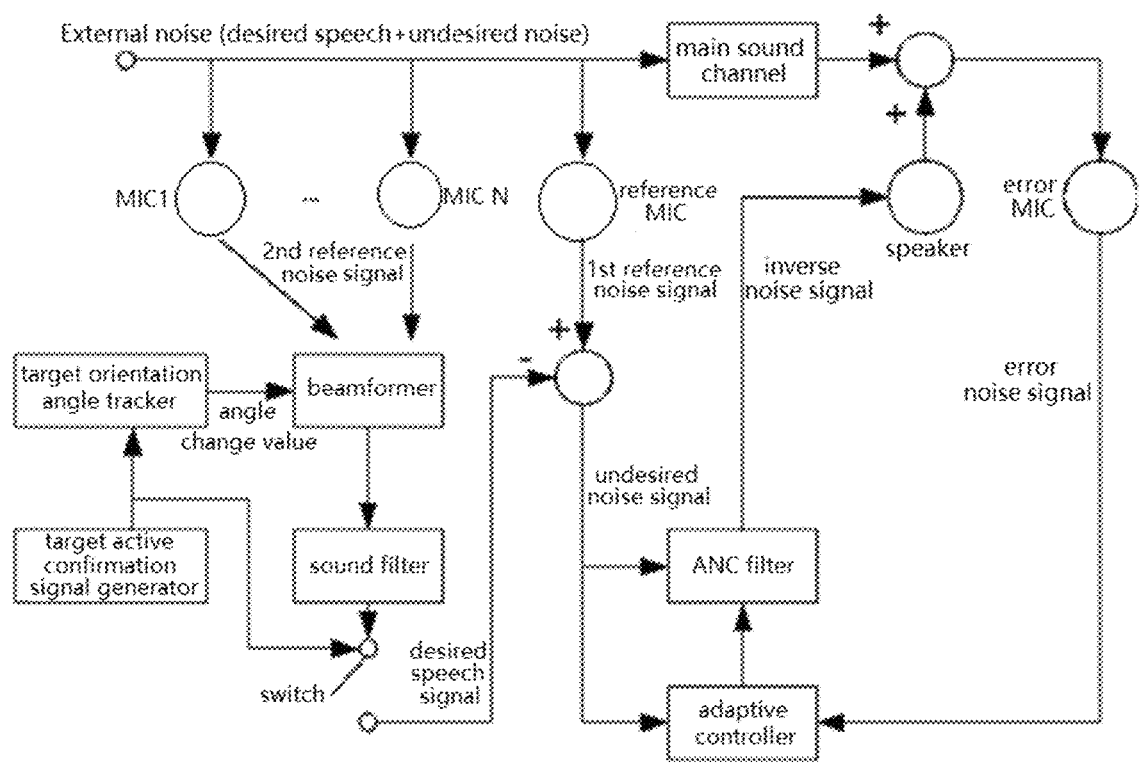
FIG. 3 is a schematic structural diagram of a headset according to embodiments of the present disclosure.

In an example, a reference is made to FIG. 3 that provides a block diagram of an apparatus for noise reduction provided on a headset. The headset includes a microphone array (microphones 1, 2, 3 . . . N), a reference microphone, a speaker, an error microphone, a target orientation angle tracker, a beamformer, a target active confirmation signal generator, a sound filter, an ANC filter, and an adaptive controller.

The user wearing the headset may face toward the sound source of the desired speech while noticing the desired speech in external noise, and then presses a specific trigger button on the headset. At this point, the target active confirmation signal generator may record the current orientation of the headset as the direction in which the user is facing toward the sound source of the desired speech. Subsequently, when changes occur to the orientation of the headset due to the turning of the user's body or head, the target orientation angle tracker may record the changes in the orientation of the headset in real time to thereby acquire the angle change value. For example, when the user presses the specific trigger button while looking horizontally directly at the sound source of the desired speech and subsequently turns the head 45° to the left along the horizontal direction, it may be inferred that the sound source of the desired speech at this point has turned 45° horizontally to the right relative to the headset. The beamformer processes the noise signal picked up by the microphone array, that is, picks up the ambient noise (i.e., external noise) in the direction of 45° to the right front of the user's head to acquire the second reference noise in FIG. 3. The sound filter separates the desired components, i.e. the desired speech signal in FIG. 3, from the second reference noise.

The reference microphone picks up the external noise to acquire the first reference noise signal. The desired speech signal in the first reference noise signal is filtered out to acquire the undesired noise signal. The adaptive controller controls to pass the first reference noise directly to the ANC filter or pass the undesired noise signal to the ANC filter. The current user desires to retain the desired speech in the ambient noise. Thus, the undesired noise signal is passed to the ANC filter.

The ANC filter filters the undesired noise signal to acquire the inverse noise signal, and then the speaker plays the inverse noise to cancel the undesired noise in the ambient noise (i.e., the external noise in FIG. 3). The ANC filter updates the filter coefficient based on the error noise signal to better cancel the undesired noise.

In some embodiments, acquiring an initial direction of desired speech in response to a trigger signal includes:

taking a preset direction as the initial direction of desired speech after receiving the trigger signal.

That is, the trigger signal is provided to the filter device from the outer side of the filter device, and the direction of the desired speech is preset with respect to the direction of the headset.

For example, the preset direction is a head frontal orientation of the headset wearer. The headset wearer needs to straightly faces toward the sound source of the desired speech signal, and then notifies, via a specific operation, the apparatus for noise reduction that the current sound source of the desired speech signal is directly in front of him or her.

Of course, the preset direction may also be a straight left direction of the headset wearer, and the straight right direction may be the sound source direction of the desired speech. There may also be a plurality of preset directions. That is, the preset direction may also be the left ear orientation or right ear orientation of the headset wearer.

In some other embodiments, after receiving the trigger signal, the apparatus for noise reduction searches for the sound source of the desired speech and determines the direction of the desired speech, which may improve the cost of the apparatus for noise reduction.

In some other embodiments, the trigger signal may be acquired based on a manual triggering of a user or based on a speech command.

For example, after the user adjusts the orientation of the headset to the sound source of the desired speech signal to which the user's head is facing, the user may press a specific button on the headset or issue a specific speech command. The speech command may, for example, be "keep the speech signal straight ahead" or "keep the speech signal in the upper left".

In some embodiments, acquiring the real-time direction of desired speech based on the real-time orientation of the headset and the initial direction of desired speech includes:
acquiring the real-time direction of desired speech by performing, on the initial direction of desired speech, a reverse compensation with equal angle according to a change in the real-time orientation of the headset relative to the initial orientation of the headset upon receiving the trigger signal.

For example, if the headset is turned 90° horizontally to the right compared to the orientation of the headset when the user presses a specific button, the real-time direction of desired speech of the headset is turned 90° horizontally to the left.

In this case, what is considered is only the changes in the posture of the headset rather than changes in the position of the headset relative to the speech source of the desired speech, because the influence of the movement of the headset on the direction of the desired speech is ignorable in most cases if the beamforming beam is set wide enough. In addition, the algorithm can be greatly simplified, and the number of operations can be reduced.

In some embodiments, the orientation tracking for the headset is performed by a gyroscope installed in the headset. That is, the posture of the headset is detected by the gyroscope. Of course, the method of determining the posture of the headset is not limited to this.

In some embodiments, extracting the desired speech signal in the real-time direction of desired speech includes:
controlling a beamformer to pick up a second reference noise signal along the real-time direction of desired speech; and
extracting the desired speech signal from the picked second reference noise signal.

The direction of the sound source of the desired speech is determinable. Thus, the desired speech signal contained in the second noise signal picked up in this direction is the clearest.

In some embodiments, extracting the desired speech signal from the picked second reference noise signal includes:
filtering out, from the second reference noise signal, frequency components beyond a preset frequency range to acquire the desired speech signal.

For example, the components of the second reference noise signal at frequencies other than the human voice frequency may be filtered out. For example, the components of the second reference noise signal with frequencies below 500 Hz or above 2000 Hz may be filtered out. Of course, the upper and lower boundaries of the human voice frequency may be set flexibly.

In some embodiments, extracting the desired speech signal from the picked second reference noise signal includes:
eigen-decomposing, with a principal component analysis algorithm, the second reference noise signal acquired by N microphones in a microphone array to acquire N eigenvalues $D_i$ (i=1, 2, ..., N) and corresponding N sets of singular vectors $U_i$ and $V_i$, wherein N refers to the number of microphones in the microphone array; and
selecting eigenvalues $D_j$ that are greater than a preset eigenvalue to calculate the desired speech signal $S=\Sigma U_j*D_j*V_j$.

The aforesaid two methods for extracting the desired speech signals may be adopted in combination. For example, the filter in an example may equalize and filter the reference noise signal in the direction of the desired speech, and the reference noise signal greater than the preset frequency value is filtered out. Then, the retained reference noise signal is eigen-decomposed with a principal component analysis (PCA) algorithm, and the retained reference noise signal herein is a signal in the direction of desired speech and may originate from N reference noise sequences Xerr output by N reference microphones. The retained reference noise signal is input to the signal feature analyzer that maps the signal onto a space orthogonal to each other with the classical PCA algorithm to acquire eigenvalues and eigenvectors as feature parameters. That is, a sequence of eigenvalues $D_i$ (i=1, 2, ..., N) composed of N eigenvalues corresponds to N sets of singular vectors $U_i$ and $V_i$ (i=1, 2, ..., N) by ordinal number, and the sequence of eigenvalues D and the corresponding set of singular vectors U and V are taken as a feature parameter set S. The number of eigenvalues and eigenvectors is same as the number of microphones. Then, eigenvalues $D_j$ that are greater than a preset eigenvalue are selected to calculate the desired speech signal $S=\Sigma U_j*D_j*V_j$. For example, the eigenvalue of j=1 is the maximum eigenvalue, and the maximum eigenvalue $D_1$ and the corresponding set of singular vectors $U_1$ and $V_1$ are adopted to restore the human voice signal S. The preset eigenvalue may be set adaptively based on experience and is all within the protection scope of this embodiment.

In some embodiments, filtering the undesired noise signal to output the inverse noise signal for speaker playback includes:
acquiring an error noise signal;
updating a filter coefficient based on the error noise signal and the undesired noise signal; and
filtering the undesired noise signal with the updated filter coefficient to acquire the inverse noise signal.

Figure 4:
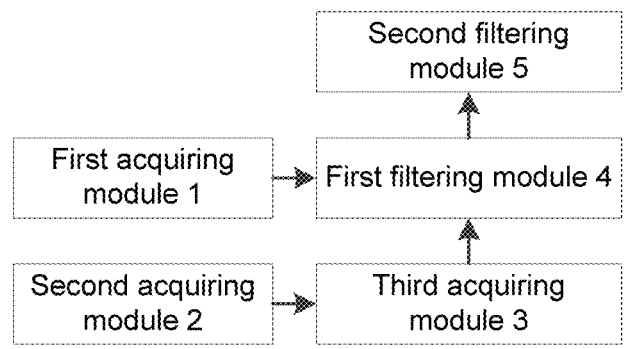
FIG. 4 is a block structural diagram of an apparatus for noise reduction according to embodiments of the present disclosure.

Referring to FIG. 4, the present disclosure further provides an apparatus for noise reduction, applicable to a headset provided with a noise reduction function. The apparatus includes:
a first acquiring module 1 configured to acquire a first reference noise signal;
a second acquiring module 2 configured to acquire an initial direction of desired speech in response to a trigger signal;
a third acquiring module 3 configured to acquire a real-time direction of desired speech based on a real-time orientation of the headset and the initial direction of desired speech, the real-time orientation being obtained by orientation tracking for the headset;

a first filtering module 4, configured to filter out a desired speech signal from the first reference noise signal to acquire an undesired noise signal, the desired speech signal being extracted in the real-time direction of desired speech; and a second filtering module 5, configured to filter the undesired noise signal to output an inverse noise signal for speaker playback.

In some embodiments, the second acquiring module 2 is specifically configured to:

take a preset direction as the initial direction of desired speech after receiving the trigger signal.

In some embodiments, the preset direction is a head frontal orientation of the headset wearer.

In some embodiments, the second acquiring module 2 is specifically configured to acquire the trigger signal based on a manual triggering of a user or based on a speech command.

In some embodiments, the third acquiring module 3 is specifically configured to:

acquire the real-time direction of desired speech by performing, on the initial direction of desired speech, a reverse compensation with equal angle according to a change in the real-time orientation of the headset relative to the initial orientation of the headset upon receiving the trigger signal.

In some embodiments, the third acquiring module includes a gyroscope for performing the orientation tracking for the headset.

In some embodiments, the first filtering module 4 is specifically configured to:

control a beamformer to pick up a second reference noise signal along the real-time direction of desired speech; and extract the desired speech signal from the picked second reference noise signal.

In some embodiments, the first filtering module 4 is specifically configured to:

filter out, from the second reference noise signal, frequency components beyond a preset frequency range to acquire the desired speech signal.

In some embodiments, the first filtering module 4 is specifically configured to:

eigen-decompose, with a principal component analysis algorithm, the second reference noise signal acquired by N microphones in a microphone array to acquire N eigenvalues $D_i$ (i=1, 2, . . . N) and corresponding N sets of singular vectors $U_i$ and $V_i$, wherein N refers to the number of microphones in the microphone array; and select eigenvalues $D_j$ that are greater than a preset eigenvalue to calculate the desired speech signal $S=\Sigma U_j^* D_j^* V_j$.

In some embodiments, the second filtering module 5 is specifically configured to:

acquire an error noise signal;

update a filter coefficient based on the error noise signal and the undesired noise signal; and filter the undesired noise signal with the updated filter coefficient to acquire the inverse noise signal.

The functions of each module in the apparatus according to embodiments of the present disclosure may be found in the corresponding descriptions of the method and will not be repeated herein. The functions of each module may be implemented in full software, full hardware, or a combination of software and hardware.

Figure 5:
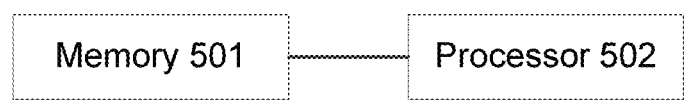
FIG. 5 is a block structural diagram of an apparatus for noise reduction according to embodiments of the present disclosure.

Referring to FIG. 5, the present disclosure further provides an apparatus for noise reduction. The apparatus includes:

at least one processor 502; and a memory 501 communicatively connected with the at least one processor 502.

The memory 501 has instructions executable by the at least one processor 502 stored therein, the instructions, when executed by the at least one processor 502, causing the at least one processor 502 to execute the aforesaid method.

The memory 501, as a non-transitory computer readable storage medium, may be configured to have non-transitory software programs, non-transitory computer executable programs, and modules, such as the program instructions/modules corresponding to one method of noise reduction according to the method embodiments of the present disclosure stored therein. The processor 502 performs various functional applications of the server and data processing by running non-transitory software programs, instructions, and modules stored in the memory 501, which means to implement one method of noise reduction according to the method embodiments of the present disclosure.

Embodiments of the present disclosure further provide a headset, which includes: the aforesaid apparatus for noise reduction, and further includes: a microphone array for beamforming, a reference microphone for picking up a first reference noise signal, an error microphone for picking up an error noise signal, and a speaker for broadcasting an inverse noise signal.

The respective embodiments of the present disclosure are described in a progressive manner. The reference may be made to each other for the same or similar parts of the respective embodiments, and each embodiment focuses on the differences from other embodiments.

The scope of the present disclosure is not limited to the aforesaid embodiments, and obviously, one skilled in the art may make various modifications and variations to the present disclosure without departing from the scope of the present disclosure. If the modifications and variations of the present disclosure fall within the scope of the claims and their equivalents, the present disclosure is also intended to encompass such modifications and variations.

What is claimed is:

1. A method of noise reduction, applicable to a headset provided with a noise reduction function, comprising:

acquiring a first reference noise signal;

acquiring an initial direction of desired speech in response to a trigger signal;

acquiring a real-time direction of desired speech based on a real-time orientation of the headset and the initial direction of desired speech, the real-time orientation being obtained by orientation tracking for the headset;

filtering out a desired speech signal from the first reference noise signal to acquire an undesired noise signal, the desired speech signal being extracted in the real-time direction of desired speech; and filtering the undesired noise signal to output an inverse noise signal for speaker playback, wherein extracting the desired speech signal in the real-time direction of desired speech comprises:

controlling a beamformer to pick up a second reference noise signal along the real-time direction of desired speech;

filtering components with frequencies exceeding a preset frequency range out of the second reference noise signal to obtain a retained signal;

eigen-decomposing, with a principal component analysis algorithm, the retained signal to acquire N eigenvalues $D_i$ (i=1, 2, . . . , N) and corresponding N sets of singular vectors $U_i$ and $V_i$, wherein N refers to the number of microphones configured for the beamformer; and selecting at least one eigenvalue $D_j$ greater than a preset eigenvalue to calculate the desired speech signal $S=\Sigma U_j*D_j*V_j$.

2. The method according to claim 1, wherein acquiring the initial direction of desired speech in response to the trigger signal comprises:

taking a preset direction as the initial direction of desired speech after receiving the trigger signal.

3. The method according to claim 2, wherein the preset direction is a head frontal orientation, a left ear orientation, or a right ear orientation of wearer of the headset.

4. The method according to claim 2, wherein the trigger signal is acquired based on a manual triggering of a user or based on a speech command.

5. The method according to claim 1, wherein acquiring the real-time direction of desired speech based on the real-time orientation of the headset and the initial direction of desired speech comprises:

acquiring the real-time direction of desired speech by performing, on the initial direction of desired speech, a reverse compensation with equal angle according to a change in the real-time orientation of the headset relative to an initial orientation of the headset upon receiving the trigger signal.

6. The method according to claim 1, wherein the orientation tracking for the headset is performed by a gyroscope installed in the headset.

7. The method according to claim 1, wherein filtering the undesired noise signal to output the inverse noise signal comprises:

acquiring an error noise signal;

updating a filter coefficient based on the error noise signal and the undesired noise signal; and filtering the undesired noise signal with the updated filter coefficient to acquire the inverse noise signal.

8. An apparatus for noise reduction, applicable to a headset provided with a noise reduction function, comprising:

a first acquiring module configured to acquire a first reference noise signal;

a second acquiring module configured to acquire an initial direction of desired speech in response to a trigger signal;

a third acquiring module configured to acquire a real-time direction of desired speech based on a real-time orientation of the headset and the initial direction of desired speech, the real-time orientation being obtained by orientation tracking for the headset;

a first filtering module configured to filter out the desired speech signal from the first reference noise signal to acquire an undesired noise signal, the desired speech signal being extracted in the real-time direction of desired speech; and a second filtering module configured to filter the undesired noise signal to output an inverse noise signal for speaker playback, wherein the first filtering module is configured to:

control a beamformer to pick up a second reference noise signal along the real-time direction of desired speech;

filter components with frequencies exceeding a preset frequency range out of the second reference noise signal to obtain a retained signal;

eigen-decompose, with a principal component analysis algorithm, the retained signal to acquire N eigenvalues $D_i$ (i=1, 2, . . . , N) and corresponding N sets of singular vectors $U_i$ and $V_i$, wherein N refers to the number of microphones configured for the beamformer; and select at least one eigenvalue $D_j$ greater than a preset eigenvalue to calculate the desired speech signal $S=\Sigma U_j*D_j*V_j$.

9. The apparatus according to claim 8, wherein the second acquiring module is configured to:

take a preset direction as the initial direction of desired speech after receiving the trigger signal.

10. The apparatus according to claim 9, wherein the preset direction is a head frontal orientation, a left ear orientation, or a right ear orientation of wearer of the headset.

11. The apparatus according to claim 8, wherein the third acquiring module is configured to:

acquire the real-time direction of desired speech by performing, on the initial direction of desired speech, a reverse compensation with equal angle according to a change in the real-time orientation of the headset relative to an initial orientation of the headset upon receiving the trigger signal.

12. The apparatus according to claim 8, wherein the third acquiring module comprises a gyroscope for performing the orientation tracking for the headset.

13. The apparatus according to claim 8, wherein the second filtering module is configured to:

acquire an error noise signal;

update a filter coefficient based on the error noise signal and the undesired noise signal; and filter the undesired noise signal with the updated filter coefficient to acquire the inverse noise signal.

14. A headset, comprising an apparatus according to claim 8, a microphone array for beamforming, a reference microphone for picking up a first reference noise signal, an error microphone for picking up an error noise signal, and a speaker for playing an inverse noise signal.

* * * * *